United States Patent Office

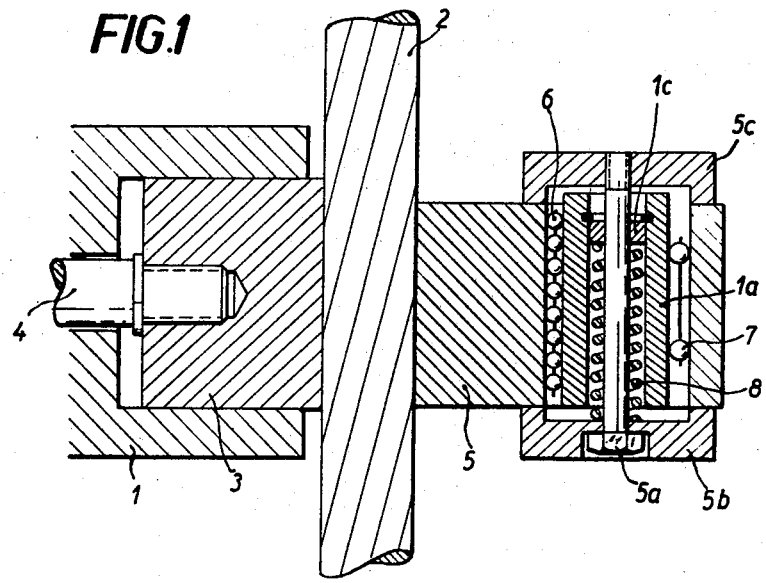
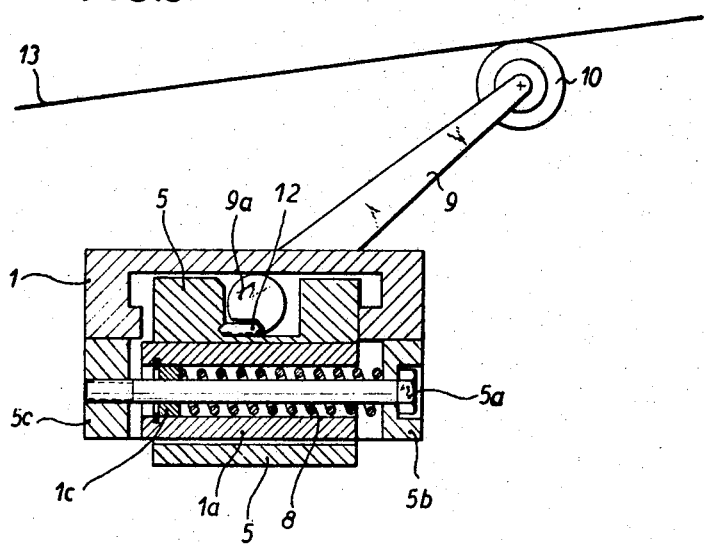

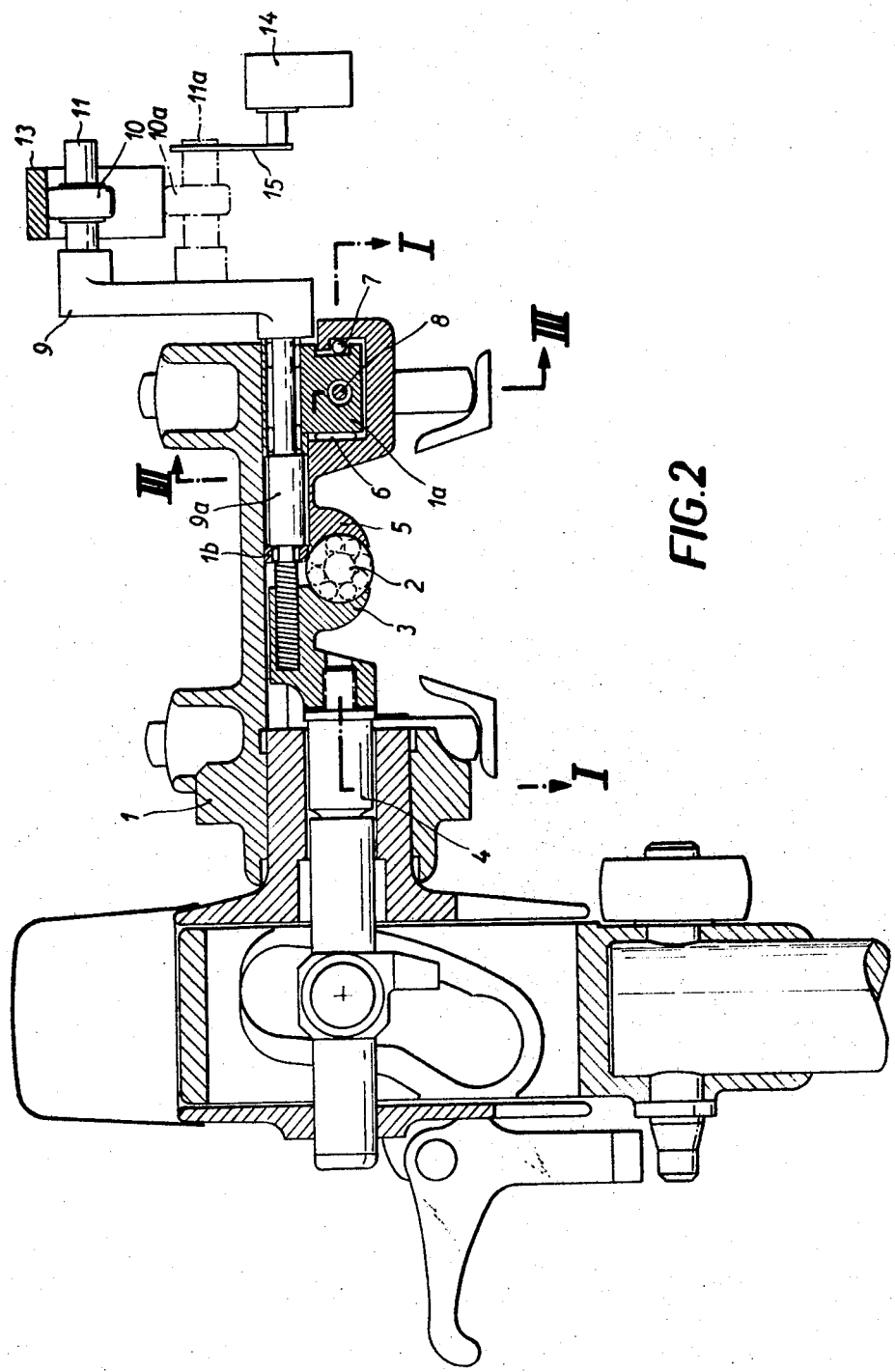

3,714,904
Patented Feb. 6, 1973

3,714,904
ARRANGEMENT FOR AUTOMATICALLY TESTING THE GRIP OF GRIPPING JAW MEANS OF CABLE CARS ON A TENSION CABLE
Hans Bruggemann and Rudolf Kulzer, Cologne, Germany, assignors to Pohlig-Heckel-Bleichert Vereinigte Maschinenfabriken Aktiengesellschaft, Cologne-Zollstock, Germany
Filed July 26, 1971, Ser. No. 165,896
Int. Cl. B61b 7/20, 11/02
U.S. Cl. 104—202      4 Claims

ABSTRACT OF THE DISCLOSURE

The arrangement is intended for use in a cableway which comprises an endless tension cable operable to revolve in an endless path, and a plurality of cars each of which comprises gripping jaw means and means for operating said gripping jaw means to grip said tension cable and thus to couple said car to said tension cable. The cableway further comprises a shut-down switch operable to interrupt the operation of said tension cable. The arrangement comprises a testing lever carried by each of said cars, a testing rail disposed in the path of said testing lever and engageable thereby and adapted to apply to said testing lever a testing force which tends to impart to said testing lever a pivotal movement in a predetermined sense, and means operatively connecting said testing lever to said gripping jaw means and arranged to present to said pivotal movement a resistance depending on the grip of said gripping jaw means on said tension cable. The testing lever is arranged to operate said shut-down switch when said force has overcome said resistance. The arrangement further comprises compression spring means, a weighing rail which is subjected to an upward bias by said compression spring means and adapted to be engaged at its top by each car and to be depressed to an extent which depends on the weight of said car, and multi-position switch means adapted to control said testing force in dependence on the extent of the depression of said weighing rail by said car.

This invention relates to an apparatus for automatically testing the grip of the gripping jaws of a gripping device which is operable adjacent to a testing rail and mounted on small cars of endless cableways, which cable cars are coupled to a tension cable. The grip can be determined in dependence on the weighable parts, which are loaded with a predetermined weight. A testing lever is provided, which serves to operate a switch whereby the cableway is shut down.

Apparatus are known which present a resistance to the movement of the cars coupled to the tension cable, which resistance exceeds by the margin of safety the largest force tending to lower the car along the line under the action of gravity. For instance, the car may move in a chain track, which is provided with a motor which is switched to operate as a generator for the tractive force test. The tensile force which must be applied to the car to overcome the testing force is composed in this case of the following components: The inertia force of the car to be tested, the inertia force of the moving chain, the inertia force of the moving cars, the inertia force of the tension cable, and the difference between the tensile forces in the tension cable before and behind the car to be tested. The inertia forces of the chain and tension cable may be considered constant. On the other hand, the inertia forces of the cars vary in dependence on the occupation of the car. The inertia force of the car to be tested has an undesired effect on the test result. The change of the tensile forces before and behind the car result in a change of the sag of the tension cable in the several spans and consequently in a change of the length of the tension cable between the testing section and the tension element of the means for driving the tension cable. For this reason, the tractive force test results in disturbing reactions on the cars and the tension cable. The cars are suddenly delayed and are thus caused to perform longitudinal oscillations. The tension cable is caused to perform transverse and longitudinal oscillations and the periodic repetition of the test with successive cars may result in such a build-up of these oscillations that large velocity fluctuations result on the line and particularly in the cableway station which is opposite to the driving station. Large fluctuations of the velocity of the tension cable have undesired effects on the coupling and testing operations. The swinging of the cars of the cableway induces feelings of insecurity and fear in some passengers.

In another known arrangement it is attempted to displace the coupled gripping device along the tension cable by means of a displacing chain having a constant displacing force. That arrangement cannot be used with testing devices in which the gripping force is produced by the weight of the load to be handled because the gripping device of empty cars would slip.

In another known arrangement, two gripping devices are used and it is attempted to increase the distance between the two gripping devices which are coupled to the tension cable. That arrangement uses a constant testing force and for this reason cannot be used for testing devices which depend on the weight of the car. The arrangement described last has further the disadvantage that it tests the tractive force of only one gripping device, namely, of the weaker gripping device, rather than the sum of the tractive forces of both gripping devices. In the use of these known arrangements, the sudden change of the tensile forces in the tension cable also results in an undesired swinging of the cables and of the cars as well as to fluctuations in the speed of travel. As a result, the inertia forces of the cars to be tested are released so that errors are introduced in the test.

It is an object of the invention to avoid the defects which have been pointed out in the known arrangements and to eliminate the effects of the inertia forces so that a more exact test result is obtained and an oscillation of the cables and cars is avoided.

This object is accomplished according to the invention in that a weighing rail is disposed adjacent to the testing section and subjected to an upward spring bias and serves to ascertain the weight of the revolving cars, and a switching device is provided and adapted to receive an input signal which is representative of the measured weight of the car to be tested and to produce an output signal which controls the loading of the weighing rail.

In a first embodiment of the apparatus according to the invention, the switching device comprises a switch having several switch positions, which are associated with respective weight ranges and control the energization of relays, which control retaining solenoids, which are operable to apply additional weights to and to lift such weights from the testing rail.

In a second embodiment of the apparatus according to the invention, the switching device comprises a test force-generating cylinder, which by a reversing solenoid valve is connected to a hydraulic system, which serves to set different pressure levels and consists of an oil reservoir, a pump, relay-controlled solenoid valves and pressure relief valves, the arrangement being such that the reversing solenoid valve is adapted to be controlled by the moving car and an additional switch and under control of a time limit relay during the gripping force test.

The invention will now be explained more fully with reference to several embodiments which are shown diagrammatically and by way of example in the drawing, in which FIG. 1 is a horizontal sectional view showing a part of the apparatus and taken on line I—I in FIG. 2.

FIG. 2 shows the apparatus in a sectional view taken transversely to the tension cable.

FIG. 3 shows the apparatus in a vertical sectional view taken on line III—III in FIG. 2 parallel to the direction of the tensile force.

Figure 4:
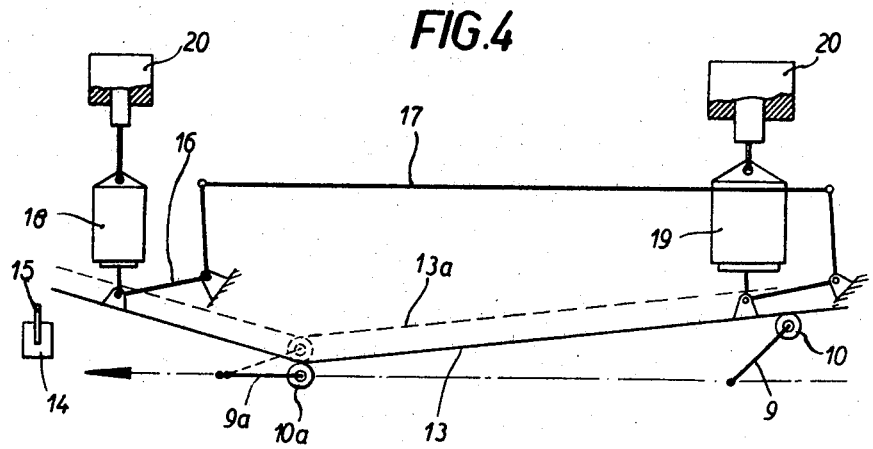
FIG. 4 is a perspective view showing the apparatus with a switching device having several switch positions associated with respective weight ranges.

The apparatus according to the invention comprises a housing 1, which contains a gripping device. The latter includes a gripping jaw 3, which is movable transversely to the direction of a tension cable 2. The jaw 3 is provided with a plunger 4 for transmitting a gripping force K. The gripping device further comprises a gripping jaw 5, which is displaceable in the longitudinal direction of the tension cable 2 and mounted on rolling elements 6, 7. The gripping force K is transmitted from the gripping jaw 5 by means of the rolling elements 6 to the housing 1. A compression spring 8 holds the gripping jaw 5 in the position shown in FIG. 1 when the gripping device is open. As is apparent from FIGS. 2 and 3, the gripping device comprises a testing lever 9, which is provided with a test roller 10 and a pin 11, and further comprises a testing rail 13 and a switch 14, which is connected to a switch lever 15.

In the embodiment shown in FIG. 4, the testing rail 13 is mounted by means of a bell-crank lever 16 and a parallel motion 17. In this embodiment, the weight exerted by the testing rail 13 can be increased by the application of different additional weights 18, 19, which are adapted to be lifted individually or jointly, e.g., by solenoids 20.

Figure 5:
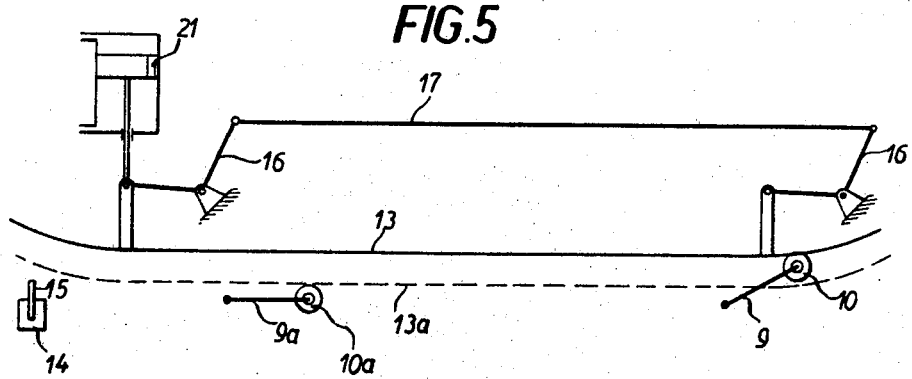
FIG. 5 is a perspective view showing the apparatus comprising a switching device which comprises a test force-generating cylinder.

The embodiment shown in FIG. 5 comprises a test force-generating hydraulic actuator 21, which is also used to lift the testing rail.

Figure 6:
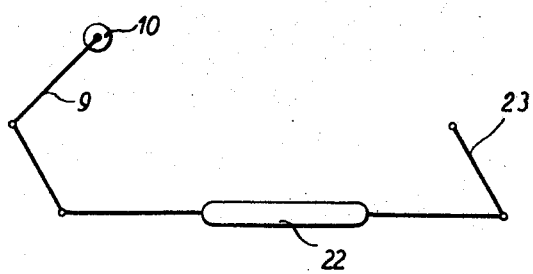
FIG. 6 shows a modification comprising two gripping devices.

The arrangement shown in FIG. 6 comprises two gripping devices. The testing lever 9 of the first gripping device is connected by a turnbuckle 22 to a testing lever 23 of the second gripping device. The sum of the tractive forces is tested in that arrangement.

The apparatus according to the invention has the following mode of operation. As the gripping device is coupled to the tension cable 2, the compression spring 8 holds the gripping jaw 5 in engagement with the housing 1. By means of the pressure member 12, the testing lever is held in its raised position at this time. When the car has been coupled to the tension cable 2, the car moves through the testing section, where the testing rail 13 applies pressure to the roller 10 of the testing lever 9. That pressure is transmitted by the pressure member 12 to the gripping jaw 5. The testing pressure is selected so that the gripping jaw 5 cannot shift along the tension cable when the grip, which is due to the gripping jaw pressure K and the coefficient of friction μ between the gripping jaw 5 and the tension cable 2, is sufficiently large. The pressure K exerted by the gripping jaw and the coefficient μ of friction between the gripping jaw 5 and the tension cable determine the tractive force. If the tractive force is too small, the gripping jaw 5 will shift against the resistance which is due to the coefficient of friction between the gripping jaw 5 and the tension cable 2 and to the force of the compression spring 8. In that case, the pin 11 of the testing lever 9 will assume a position as indicated at 11a and by means of the switching lever 15 will operate the switch 14 to shut down the drive means of the cableway. If the tractive force is sufficient, the roller 10 carried by the testing lever 9 will force the testing rail 13 upwardly to a position as indicated at 13a. The switch 14 is not operated in this case because the pin 11 carried by the testing lever 9 does not contact the switching lever 15.

With gripping devices which depend on the weight of the car, the tractive force will depend on the occupation of the car or the useful load applied to the car. For this reason, empty or partly loaded cars cannot be tested with the same testing force as fully loaded cars.

Figure 7:
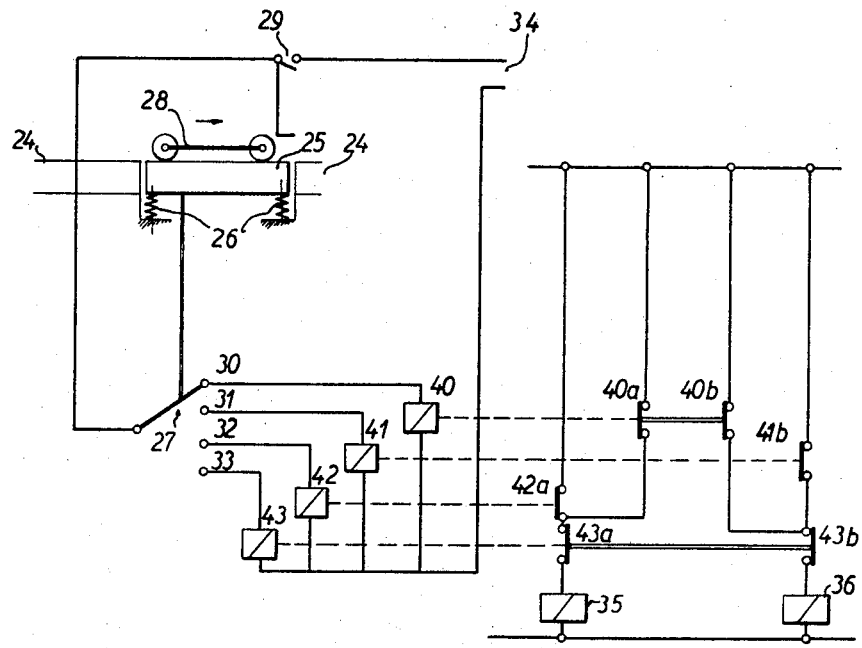
FIG. 7 is a circuit diagram for the embodiment of FIG. 4.

In the embodiment shown in FIG. 4 of the apparatus for automatically testing the grip of the gripping jaws, means are provided for disabling the additional weights 18, 19, which have different values and which can be raised individually or jointly by solenoids 20. This enables a testing of the grip with reference to four graded values. In this embodiment, the solenoids 20 for operating the additional weights 18, 19 are controlled by the switching device which is shown in FIG. 7. That switching device is coupled to a weighing device and serves to automatically control the testing force, which in accordance with FIG. 4 is applied to the testing lever 9 by the testing rail 13. The track rail 24 incorporates a weighing rail 25, to which an upward bias is applied by compression springs 26. The weighing rail 25 is connected to a multiple-position switch 27, which comprises a plurality of fixed contacts 30–33, which are associated with respective weight ranges. The weight of a car 28 moving in the direction of the arrow initially moves the switch 27 against the force of the springs 26 and then closes a switch 29 for a short time. The control voltage is applied to contacts 34. The fixed contacts 30–33 are connected to respective relays 40–43 and control the energization thereof. The relays 40–43 control retaining solenoids 35, 36, by which the additional weights 18, 19 can be applied or lifted.

The means for lifting the additional weights 18 and 19 may be controlled by an arrangement such as that shown in FIG. 7. Before the testing operation, that arrangement automatically controls the magnitude of the testing force to be applied by the testing rail 13 to the testing lever 9 in dependence on the weight of the car 28. The car 28 depresses the weighing rail 25 against the force of the springs 26 so that the movable contact of the switch 27 engages one of the fixed contacts 30–33. As the car 28 proceeds, it closes the switch 29 to energize the associated one of relays 40–43. The fixed contact 30 and relay 40 are associated with the weight of the empty car, the fixed contact 31 and relay 41 with one-third of the useful load, the fixed contact 32 and relay 42 with two-thirds of the maximum useful load and the fixed contact 33 and the relay 43 with the maximum useful load.

When the car is empty, the relay 40 closes the contacts 40a and 40b so that the solenoid 35 for lifting the smaller additional weight 18 and the solenoid 36 for lifting the larger additional weight 19 are energized. The two additional weights are raised and only the weight of the testing rail 13 determines the testing force. With a car carrying one-third of the useful load, the relay 41 is energized to close the contact 41b so that only the solenoid 36 is energized to lift the large additional weight 19. The testing force is now determined by the weight of the testing rail 13 and the small additional weight 18.

With a car carrying two-thirds of the maximum useful load, the relay 42 closes the contact 42a so that only the solenoid 35 is energized and only the small additional weight 18 is lifted. The testing force is determined by the weight of the testing rail 13 and the large additional weight 19.

With a car carrying the maximum useful load, the relay 43 is energized to open the contacts 43a and 43b so that neither of the solenoids 35 and 36 is energized and none of the additional weights 18 and 19 is lifted. The testing force is now determined by the weight of the testing rail 13 and the two additional weights 18 and 19.

During the operation of the cableway it will often be necessary to test cars carrying equal loads. An unnecessary operation of the means for lifting the additional weights will be avoided if the arrangement is such that the energization of a relay will be maintained until a car having a weight in a different range causes the energization of a different relay. The primary energization of a relay by the switch 27 has the secondary effect of de-energizing all other relays.

In the embodiment of the apparatus shown in FIG. 4, the engagement of the roller 10 with the underside of the testing rail, which is slightly inclined relative to the path of travel of the car 28, does not result in a substantial change of the tensile forces in the tension cable before and behind the car. The same remark is applicable to the embodiment shown in FIG. 5, where the testing rail is not inclined at all relative to the path of travel so that only the negligibly small resistance presented by the rolling friction of the testing rail as it applies the testing force must be overcome in the direction of travel. That resistance is negligibly small because a sufficiently high transmission ratio may be provided for between the displacement of the gripping jaw 5 and the descent of the testing roller 10 so that a relatively small testing force applied to the roller 10 will be sufficient.

In the embodiment of the apparatus which is shown in FIG. 5 the testing rail 13 is held in an elevated position by the actuator 21 as long as there is no car in the testing section. In response to the movement of a car into the testing section, the actuator 21 applies by means of the testing rail 13 a certain pressure to the roller 10 carried by the testing lever 9. That pressure tends to depress the roller 10 and to displace the gripping jaw 5 against the resistance which is due to the friction between the jaw 5 and the tension cable 2 and to the force of the compression spring 8.

Unless the gripping force is sufficient, this displacement will be effected and will cause the testing rail 13 to assume the position 13a so that the pin 11a of the testing lever 9 by means of the switch 14 causes the drive means for the cableway to be shut down.

Figure 8:
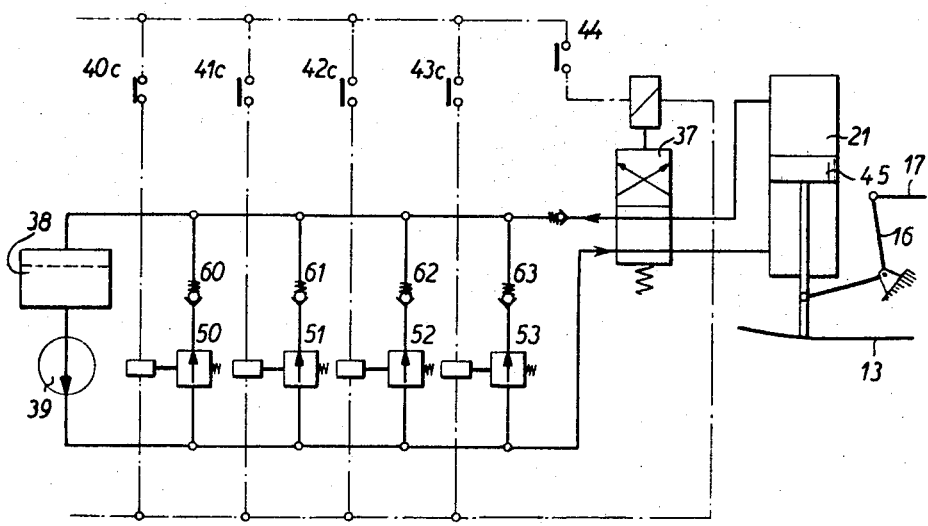
FIG. 8 is a circuit diagram for the embodiment of FIG. 5.

FIG. 8 is a circuit diagram of the apparatus shown in FIG. 5 for an automatic test of the grip. The actuator 21 is connected by a solenoid valve 37 with a system for producing various pressure levels. That system comprises an oil reservoir 38, a pump 39, solenoid valves 50–53 and pressure relief valves 60–63, which are set to open at different pressures. The solenoid valves 50–53 are opened in response to the energization of the respective relays 40–43 shown in FIG. 7. The solenoid valve 50 is shown in an open position. The pressure applied to the solenoid valve 37 is determined by the flow of oil through a path which has been made available by the opening of one of the solenoid valves 50–53 and the associated one of the pressure relief valves 60–63. The solenoid valve 37 is operated by an additional switch 44, which is operated by the moving car, and is held operated by a time limit relay for the duration of the tractive force test and when operated transmits the pressure applied to it to the top of the piston 45 so that the testing rail 13 applies a controlled testing force to the testing lever 9.

In the operation of the embodiment shown in FIG. 5, the weight of the car 28 just as in FIG. 7 causes the multiple-position switch 27 to be shifted so that one of the relays 40–43 is energized. The corresponding one of the solenoid valves 50–53 is operated in response to the closing of the contact 40c, 41c, 42c or 43c of that of the relays 40–43 which has been energized. As a result, the pressure oil discharged by the continuously operating pump can flow through one of the pressure relief valves 60–63, which are set to open at different pressures. The controlled oil pressure is applied to the solenoid valve 37 and initially holds the testing rail 13 in an elevated position. As the car moves into the testing section, it operates the switch 44 to operate the solenoid valve 37 for a time which is determined by the time limit relay. As a result, the oil pressure is applied to the top of the piston 45 and the testing rail 13 is caused to apply a controlled testing force to the testing lever 9. When the testing time has expired, the solenoid valve 37 is reset to apply the oil pressure to the underside of the piston 45 so that the testing rail 13 is lifted.

What is claimed is:

1. For use in a cableway which comprises an endless tension cable operable to revolve in an endless path, a plurality of cars each of which comprises gripping jaw means and means for operating said gripping jaw means to grip said tension cable and thus to couple said car to said tension cable, said cableway further comprising a shut-down switch operable to interrupt the operation of said tension cable,
    an arrangement for automatically testing the grip of said gripping jaw means of each of said cars on said tension cable, said arrangement comprising
    a testing lever carried by each of said cars,
    a testing rail disposed in the path of said testing lever and engageable thereby and adapted to apply to said testing lever a force which tends to impart to said testing lever a pivotal movement in a predetermined sense,
    means operatively connecting said testing lever to said gripping jaw means and arranged to present to said pivotal movement a resistance depending on the grip of said gripping jaw means on said tension cable,
    said testing lever being arranged to operate said shutdown switch when said force has overcome said resistance,
    said arrangement further comprising
    compression spring means,
    a weighing rail which is subjected to an upward bias by said compression spring means and adapted to be engaged at its top by each car and to be depressed to an extent which depends on the weight of said car, and
    multi-position switch means adapted to control said testing force in dependence on the extent of the depression of said weighing rail by said car.

2. An arrangement as set forth in claim 1, which comprises
    a plurality of solenoid means selectively energizable to control said testing force,
    a plurality of relays for controlling the energization of respective ones of said solenoid means, and
    a multi-position switch having a plurality of fixed contacts associated with respective weight zones and electrically coupled to respective ones of said relays, and a movable contact which is operatively connected to said weighing rail and arranged to engage that of said fixed contacts which is associated with a weight zone corresponding to the weight of a car which engages said weighing rail.

3. An arrangement as set forth in claim 2, which comprises additional weights adapted to be selectively applied to and lifted from said testing rail under control of said solenoid means.

4. An arrangement as set forth in claim 1, which comprises
    a double-acting hydraulic actuator operatively connected to said testing rail and adapted to admit liquid under pressure in a first direction to lift said testing rail and in a second direction to lower said testing rail,
    a reversing solenoid valve movable between normal and operated positions, in which it connects said actuator to admit liquid in said first and second directions, respectively, an oil reservoir, a pump operable to move oil under pressure from said oil reservoir through said reversing valve to said actuator, a plurality of by-pass conduits connected in parallel between said pump and said reservoir and by-passing said reversing switch and said actuator, each of said by-pass conduits including a by-pass solenoid valve and a pressure relief valve in series with said by-pass solenoid valve, said pressure relief valves being set to open at different pressures, a switch which is arranged to operate said reversing solenoid valve in response to the engagement of said testing rail with said testing lever, a time limit relay adapted to hold said reversing solenoid valve in said operated position for a predetermined time, and a plurality of relays which are selectively energizable under control of said multi-position switch means and which control the energization of respective ones of said by-pass solenoid valves.

References Cited

UNITED STATES PATENTS

| 3,394,661 | 7/1968 | Müller | 104—202 |
| 3,405,652 | 10/1968 | Meszaros | 104—204 |
| 3,585,941 | 6/1971 | Primo | 104—202 |
| 3,610,164 | 10/1971 | Feuz | 104—204 |

FOREIGN PATENTS

| 916,059 | 10/1954 | Germany | 104—202 |
| 919,114 | 10/1954 | Germany | 104—202 |

DRAYTON E. HOFFMAN, Primary Examiner

U.S. Cl. X.R.

104—208, 214